United States Patent Office 3,691,076
Patented Sept. 12, 1972

3,691,076
PROCESS FOR PREPARING HYDROCARBON LUBRICATING OIL CONTAINING CALCIUM ALKYLPHENOLATE
Harry Chafetz, Poughkeepsie, William H. Canning, Wappingers Falls, and Bertrand G. Morissette, Beacon, N.Y., assignors to Texaco Inc., New York, N.Y.
No Drawing. Filed Sept. 14, 1970, Ser. No. 72,121
Int. Cl. C10m 1/20, 1/54
U.S. Cl. 252—42.7
9 Claims

ABSTRACT OF THE DISCLOSURE

A method of preparing a lubricating oil composition of detergent properties containing a normal calcium alkylphenolate comprising contacting in the presence of acetic acid, alkylphenol, a calcium member selected from the group consisting of calcium oxide and calcium hydroxide and a hydrocarbon oil of lubricating viscosity.

BACKGROUND OF INVENTION

This invention relates to a method of preparing lubricating oil concentrates of normal calcium alkylphenolate.

Hereinafter, the term "normal calcium alkylphenolate" is defined as the calcium salt of alkylphenol having a calcium metal ratio of 1. Calcium metal ratio is defined as the ratio of the number of equivalents of calcium per equivalent of alkylphenol moiety.

The calcium alkylphenolates are useful as additives for lubricating oils in that they promote, when used in crankcase lubricants for internal combustion engines, general engine cleanliness, reduced ring sticking, reduced piston skirt varnish formation and reduced corrosiveness of the oil. Normally, the contemplated calcium salts are prepared in the form of lube oil concentrates to facilitate their manufacture, handling and incorporation in finished lubricating oil compositions.

In the past, one of the methods employed for preparing calcium alkylphenolates comprised reacting an alkylated phenol with calcium oxide or calcium hydroxide. Although this method produced a satisfactory normal calcium alkylphenolate, it had a major drawback of being relatively slow and requiring alcoholic solvents. In order to overcome the relative inactivity of calcium oxide or calcium hydroxide, a procedure was developed as set forth in coassigned application Ser. No. 72,120, filed concurrently herewith. Wherein a combination of alkoxyalkanol and oxygen blowing is employed to promote the yield of normal calcium alkylphenolate. Although this latter method is a substantial advance in the art, it does have the limitation of requiring the mandatory use of an alkoxyalkanol ingredient which undesirably adds to the cost of normal calcium alkylphenolate production. Alternative methods in the art prepare calcium alkylphenolates by reacting alkylated phenol with calcium carbide in the presence of alkanol or alkoxyalkanol. Although the calcium carbide method produced a calcium alkylphenolate product of satisfactory yield and filterability, is required the use of an alkanol or alkoxyalkanol ingredient and relatively costly calcium carbide. There was, therefore, a need in the art for a method utilizing calcium oxide or calcium hydroxide which would have a rate of yield comparable to the calcium carbide procedures and yet not require the mandatory use of an alkoxyalkanol and/or alkanol.

SUMMARY OF INVENTION

We have discovered and this constitutes our invention a method of preparing a normal calcium alkylphenolate utilizing calcium oxide or calcium hydroxide wherein there is a significant improvement in yield rate of calcium alkylphenolate whether or not an alkoxyalkanol and/or alkanol is present. More particularly, we have discovered that in a mixture of alkylphenol, calcium oxide or calcium hydroxide and a lubricating oil, acetic acid functions to promote in a substantial degree the production of normal calcium alkylphenolate and further improves production irrespective of whether or not an alcohol is present.

DETAILED DESCRIPTION OF THE INVENTION

In detail, the method of the invention comprises reacting an alkylated phenol of the general formula:

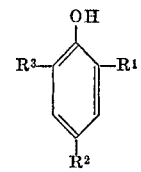

where $R^1$ and $R^3$ are selected from the group consisting of hydrogen and alkyl of 1 to 30 carbons and $R_2$ is alkyl of from 4 to 30 carbons with a calcium member selected from the group consisting of calcium oxide or calcium hydroxide in the presence of a hydrocarbon lubricating oil diluent and acetic acid. The reaction is advantageously conducted at a temperature between about 125 and 250° C., utilizing a mole ratio of acetic acid to calcium oxide or calcium hydroxide of between about 0.02:1 and 0.3:1 and a mole ratio of calcium oxide or calcium hydroxide to alkylphenol of between about 0.5:1 to 1.3:1. The quantity of lubricating oil employed can be widely varied, e.g., between about 10 and 90 wt. percent of the reaction mixture; however, most desirably, it is that quantity which will result in a final lube oil concentrate after removal of volatile materials comprising between about 45 and 55 wt. percent lubricating oil and between about 55 and 45 wt. percent calcium alkylphenolate. Under preferred conditions, reaction is conducted in an inert atmosphere and under an inert gas purge such as with nitrogen. In a preferred procedure, an alcohol member is also utilized specifically one selected from the group consisting of an alkanol of from 1 to 9 carbons and an alkoxyalkanol characterized by the formula:

$$R^4OR^5OH$$

where $R^4$ is a monovalent saturated aliphatic hydrocarbon radical (alkyl) of 1 to 5 carbons and $R^5$ is polymethylene of from 2 to 4 carbons. When present the alcohol is advantageously found in an amount between about 10 and 50 wt. percent based on the reaction mixture. Under most preferred conditions, said alcohol, said calcium member and said acetic acid are contacted with one another at a temperature between about 50 and 150° C. prior to the addition of alkylphenol and lubricating oil diluent ingredients.

The normal calcium alkylphenolate containing lube oil concentrates can be isolated from the final reaction mixture by standard means such as removing the free alcohol, if employed, and any volatile by-products as a distillate at a temperature between about 130 and 250° C., advantageously employing in conjunction with the distillation a stripping operation involving passage of an inert gas such as nitrogen thru the final reaction mixture to effect essentially complete removal of the volatile products leaving a stripped normal calcium alkylphenolate containing lube oil concentrate. Temperatures normally in the neighborhood of between about 130 and 210° C. are employed in the stripping operation in conjunction with reduced pressure if necessary. The stripped concentrate can be further purified by filtering, e.g., utilizing a filter bed of finely diatomaceous silica to remove the undesired large solid product particles thereby recovering a normal calcium alkylphenolate dispersion in lubricating oil. A material aspect of the method of the invention is the use of acetic acid. In the absence of acetic acid, calcium alkylphenolate is not produced unless an alkoxyalkanol is present and if an alkoxyalkanol is present the yields of normal calcium alkylphenolate product are substantially less in the absence of acetice acid.

Examples of the alkylated phenol reactants contemplated herein are the alkylphenols prepared by alkylating phenol with an olefin polymer such as propylene polymer containing 9 to 30 carbons. One specific example is a mixture of alkylphenols resulting from the alkylation of phenol with a propylene tetramer. This mixture is composed of phenols having the $C_{10}$-, $C_{11}$-, $C_{12}$- ($C_{10}$-$C_{12}$) alkyl group primarily in the para ring position. Further specific examples of suitable alkylated phenols are 4-butylphenol, 4-amylphenol, 4-hexylphenol, 4-octylphenol, 4-hexadecylphenol, 2,4-dibutylphenol, 2,4-dioctylphenol, 2,4-dihexadecylphenol, 2,4-dioctadecylphenol, 2,4,6-tributylphenol, 2,4,6-trioctadecylphenol, 4-eicosylphenol and mixtures thereof.

Examples of the optionally employed alcohols are 2-methoxyethanol, 2-ethoxyethanol, 2-butoxyethanol, 3-methoxypropanol, methanol, butanol and hexanol.

Examples of the hydrocarbon lubricating oil diluent which can be employed are the mineral lubricating oils, e.g., of the refined paraffin and naphthenic base variety having an SUS viscosity at 100° F. of between about 50 and 2000. Also contemplated are the synthetic hydrocarbon lubricating oils of the polymer variety such as polymers of propylene and butylene.

Specific examples of the normal calcium alkylphenolates contemplated herein and characterized by the formula:

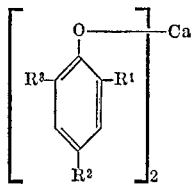

where $R^1$, $R^2$ and $R^3$ are as heretofore defined, are calcium 4-decylphenolate, calcium 4-undecylphenolate, and calcium 4-dodecylphenolate. Additional examples are calcium 4-butylphenolate, calcium 4-amylphenolate, calcium 4-hexylphenolate, calcium 4-octylphenolate, calcium 4-hexadecylphenolate, calcium 2,4-dibutylphenolate, calcium 2,4-dioctylphenolate, calcium 2,4-dihexadecylphenolate, calcium 2,4-dioctadecylphenolate, calcium 2,4,6-tributylphenolate, calcium 2,4,6-trioctadecylphenolate, calcium 4-eicosylphenolate and mixtures thereof.

The following examples further illustrate the method of the invention but are not to be construed as limitations thereof.

Example I

This example illustrates the two step embodiment of the method of the invention, namely, wherein acid member and calcium member are first contacted with alcohol followed by contacting with oil and alkylphenol.

To a one liter flask fitted with a stirrer, reflux condenser, thermocouple and gas inlet and exit tube, there were charged an alcohol, acetic acid and calcium oxide. The resultant mixture was heated to reflux (125° C.) for 3 hours followed by the addition of a naphthenic base lubricating oil of an SUS viscosity of about 100 at 100° F. and $C_{10}$-$C_{12}$ alkylphenol. The resultant mixture was heated to 210° C. while stripping off alcohol and stirred at that temperature for a period of 3 hours. The entire reaction was carried out under a nitrogen purge of 100 mls./minute in the first step and 500 mls./minute in the final step. The resultant product was then filtered through diatomaceous silica. The test data and results are reported below in Tables I and I-A, the yield of normal calcium $C_{10}$-$C_{12}$ alkylphenolate in lube oil concentrate filtrate is expressed in wt. percent calcium. Runs A, E and G represent the method of the invention and Runs B, C, D and F are comparative runs.

TABLE I

| Run | A | B | C | D |
|---|---|---|---|---|
| Ingredients: | | | | |
| $C_{10}$-$C_{12}$ alkylphenol, g | 280 | 280 | 280 | 140 |
| CaO, g | 28 | 28 | 28 | 14 |
| Lube oil, g | 300 | 300 | 300 | 150 |
| $CH_3COOH$, g | 6 | | | |
| Methoxyacetic acid, g | | | 11 | |
| 2-methoxyethanol, ml | 500 | 500 | 500 | |
| 2-ethoxyethanol, ml | | | | 250 |
| Product: | | | | |
| Weight percent Ca (theory 3.35) | 3.2 | 2.8 | 2.9 | 1.4 |
| Lube concentrate, g | 530 | 528 | 528 | 253 |

TABLE I-A

| Run | E | F | G |
|---|---|---|---|
| Ingredients: | | | |
| $C_{10}$-$C_{12}$ alkylphenol, g | 140 | 280 | 280 |
| CaO, g | 14 | 28 | 35 |
| Lube oil, g | 150 | 300 | 300 |
| $CH_3COOH$, g | 3 | | 6 |
| 2-ethoxyethanol, ml | 250 | | |
| 1-butanol, ml | | 500 | 500 |
| Product: | | | |
| Weight percent Ca (theory 3.35) | 2.9 | 0 | 2.7 |
| Lube concentrate, g | 258 | | 502 |

Example II

This example illustrates a second embodiment of the invention, namey, the one step reaction of alkylphenol, calcium member, diluent oil and acetic acid. The general reaction sequence was as follows:

In an apparatus as described in Example I all reactants were combined and heated to 210° C. under a nitrogen purge for a period of time (ranging from 3 to 12 hours) followed by filtration of the product through diatomaceous earth to recover a lube oil concentrate containing a normal calcium $C_{10}$-$C_{12}$ alkylphenolate, said phenolate content in the concentrate being measured in terms of wt. percent calcium. The test data and results are reported below in Table II. Runs H, I and K represent the method of the invention and Run J is a comparative run.

TABLE II

| Run | H | I | J | K |
|---|---|---|---|---|
| Ingredients: | | | | |
| $C_{10}$-$C_{12}$ alkylphenol, g | 280 | 280 | 280 | 280 |
| CaO, g | 36 | 36 | 36 | |
| Ca(OH)$_2$ | | | | 44 |
| Lube oil, g.[1] | 300 | 300 | 300 | 300 |
| Acetic acid, g | 6 | 6 | | 4.2 |
| React. time, hrs | 3 | 7 | 3 | 8 |
| Product: | | | | |
| Wt. percent Ca (theory 3.35) | 2.4 | 2.6 | 0 | 1.5 |
| Lube conc., g | 535 | 537 | | 520 |

[1] Naphthenic oil of SUS viscosity at 100° F. of ~100.

We claim:
1. A method of preparing a lubricating oil composition containing a normal calcium alkylphenolate characterized by the formula:

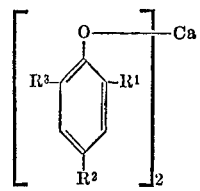

where $R^1$ and $R^3$ are selected from the group consisting of hydrogen and alkyl of from 1 to 30 carbons and $R^2$ is alkyl of from 4 to 30 carbons, consisting essentially of contacting alkylphenol with a calcium member selected from the group consisting of calcium oxide and calcium hydroxide in the presence of acetic acid and a hydrocarbon lubricating oil diluent, said alkylphenol characterized by the formula:

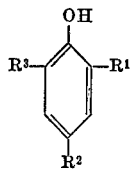

where $R^1$, $R^2$ and $R^3$ are as heretofore defined, at a temperature between about 125 and 250° C. in a mole ratio of acetic acid to said calcium member of between about 0.02:1 and 0.3:1 and a mole ratio of said calcium member to said alkylphenol of between about 0.5:1 and 1.3:1.

2. A method in accordance with claim 1 wherein prior to said contacting said calcium member is mixed and heated at a temperature between about 50 and 125° C. with an alcohol selected from the group consisting of alkanol of 1 to 9 carbons and alkoxyalkanol of the formula:

$$R^4OR^5OH$$

where $R^4$ is alkyl of from 1 to 5 carbons and $R^5$ is polymethylene of 2 to 4 carbons and introducing the resultant mixture into said contacting.

3. A method in accordance with claim 1 wherein said contacting is conducted in an inert atmosphere, said lubricating oil diluent is of a lubricating viscosity between about 50 and 2000 SUS at 100° F. and said oil being present in an amount of between about 10 and 90 wt. percent of the reaction mixture in said contacting.

4. A method in accordance with claim 3 wherein said alkylphenol is $C_{10}$–$C_{12}$ alkylphenol and said calcium member is calcium oxide.

5. A method in accordance with claim 3 wherein said alkylphenol is $C_{10}$–$C_{12}$ alkylphenol and said calcium member is calcium hydroxide.

6. A method in accordance with claim 2 wherein said contacting is conducted in an inert atmosphere, said lubricating oil diluent is of a lubricating viscosity between about 50 and 2000 SUS at 100° F. and said oil being present in an amount of between about 10 and 90 wt. percent of the reaction mixture in said contacting.

7. A method in accordance with claim 6 wherein said alcohol is 2-methoxyethanol and said member is calcium oxide.

8. A method in accordance with claim 6 wherein said alcohol is 2-ethoxyethanol and said member is calcium oxide.

9. A method in accordance with claim 6 wherein said calcium member is calcium oxide and said alcohol is 1-butanol.

References Cited
UNITED STATES PATENTS

| | | | |
|---|---|---|---|
| 3,130,160 | 4/1964 | Morway et al. | 252—42.7 X |
| 3,493,516 | 2/1970 | Allphin et al. | 252—42.7 X |
| 2,870,134 | 1/1959 | Kluge et al. | 252—42.7 X |
| Re. 26,811 | 3/1970 | Cohen | 252—42.7 X |

DANIEL E. WYMAN, Primary Examiner

W. CANNON, Assistant Examiner

U.S. Cl. X.R.

260—624 R